US007226176B1

(12) United States Patent
Huang

(10) Patent No.: US 7,226,176 B1
(45) Date of Patent: Jun. 5, 2007

(54) DETACHABLE SCREEN PROTECTOR ASSEMBLY WITH A FASTENING APPARATUS

(75) Inventor: Wen-Liang Huang, Taipei Hsien (TW)

(73) Assignee: Hony Glass Factory Co., Ltd., Wugu Hsiang, Taipei Hsien (TW)

( * ) Notice: Subject to any disclaimer, the term of this patent is extended or adjusted under 35 U.S.C. 154(b) by 0 days.

(21) Appl. No.: 11/423,425

(22) Filed: Jun. 9, 2006

(51) Int. Cl.
*G02B 27/00* (2006.01)
*A44B 1/18* (2006.01)
*A44B 13/00* (2006.01)

(52) U.S. Cl. ............ 359/609; 359/601; 359/809; 248/205.2

(58) Field of Classification Search ........ 359/601–615, 359/808–819; 348/832–844; D14/113–114, D14/239, 450; 345/32, 905; 248/205.2–205.3
See application file for complete search history.

(56) References Cited

U.S. PATENT DOCUMENTS 4,834,330 A * 5/1989 Swillinger ............... 248/205.2
4,958,907 A * 9/1990 Davis ..................... 359/809
5,130,853 A * 7/1992 Sakurai ................... 359/803
5,580,145 A * 12/1996 Yamada et al. ............ 353/74
5,797,570 A * 8/1998 Dolan et al. ............ 248/205.3
5,803,424 A * 9/1998 Keehn et al. ............ 248/489
5,971,548 A * 10/1999 Hung ..................... 359/609

* cited by examiner

Primary Examiner—Thong Q. Nguyen
(74) Attorney, Agent, or Firm—James H. Walters

(57) ABSTRACT

A detachable screen protector assembly mounted on a screen frame of a monitor having a lower front surface and an upper front surface and has a screen protector and a fastening apparatus. The fastening apparatus has at least one couple of a bracket and a detachable hook. The bracket is mounted on the screen frame to hold the screen protector. The detachable hook corresponds to the bracket, is mounted the screen frame above the bracket and holds the screen protector. The detachable hook has a bracket member mounted on the upper front surface of the screen frame and a hooking member detachably mounted to the bracket member and holding the screen protector. Because the hooking member may disengage from the bracket member, the screen protector can be detached from the screen frame to be cleaned or be mounted on other monitors when people change their monitor.

8 Claims, 4 Drawing Sheets

DETACHABLE SCREEN PROTECTOR ASSEMBLY WITH A FASTENING APPARATUS

BACKGROUND OF THE INVENTION

1. Field of Invention

The present invention relates to a detachable screen protector assembly, and more particularly to a detachable screen protector assembly with a fastening apparatus to detachably fastening a screen protector on a monitor screen.

2. Description of the Related Art

A cathode ray tube (CRT) monitor has a CRT screen and generates a high radiation to hurt people when operating, so many people will mount a screen protector on the CRT screen to obstruct the radiation and prevent the radiation to hurt people.

A liquid-crystal display (LCD) monitor is light and thin, has a LCD screen and generates a low radiation, so a LCD monitor is gradually in place of the CRT monitor. However, the surface of the LCD screen is soft and easily worn off when people touch it and is hardly cleaned when dust, oil or other contamination contaminates the LCD screen, so a visual quality of the screen will be decreased. Thus, people will mount the screen protector on the LCD screen to prevent the LCD screen from wearing and contaminating. However, a conventional screen protector is a film mounted on the LCD screen by glue and can not be detached from the LCD screen to be cleaned or to be mounted on other LCD screens when people change their LCD monitor, so it is inconvenient for people.

To overcome the shortcomings, the present invention provides a detachable screen protector assembly with a fastening apparatus to mitigate or obviate the aforementioned.

SUMMARY OF THE INVENTION

The primary objective of the present invention is to provide a detachable screen protector assembly with a fastening apparatus to allow the screen protector to be detachable from a screen frame of a monitor.

To achieve the objective, a detachable screen protector assembly mounted on a screen frame of a monitor having a lower front surface and an upper front surface and has a screen protector and a fastening apparatus. The fastening apparatus comprises at least one couple of a bracket and a detachable hook. The bracket is mounted on the screen frame to hold the screen protector. The detachable hook corresponds to the bracket, is mounted on the screen frame and holds the screen protector. The detachable hook has a bracket member and a hooking member. The bracket member is mounted on the upper front surface of the screen frame. The hooking member is detachably mounted to the bracket member and holds the screen protector. Because the hooking member is detachable from the bracket member, the screen protector can be detached from the screen frame to be cleaned or to be mounted on other monitors when people change their monitor.

Other objectives, advantages and novel features of the invention will become more apparent from the following detailed description when taken in conjunction with the accompanying drawings.

DETAILED DESCRIPTION OF THE INVENTION

Figure 1:
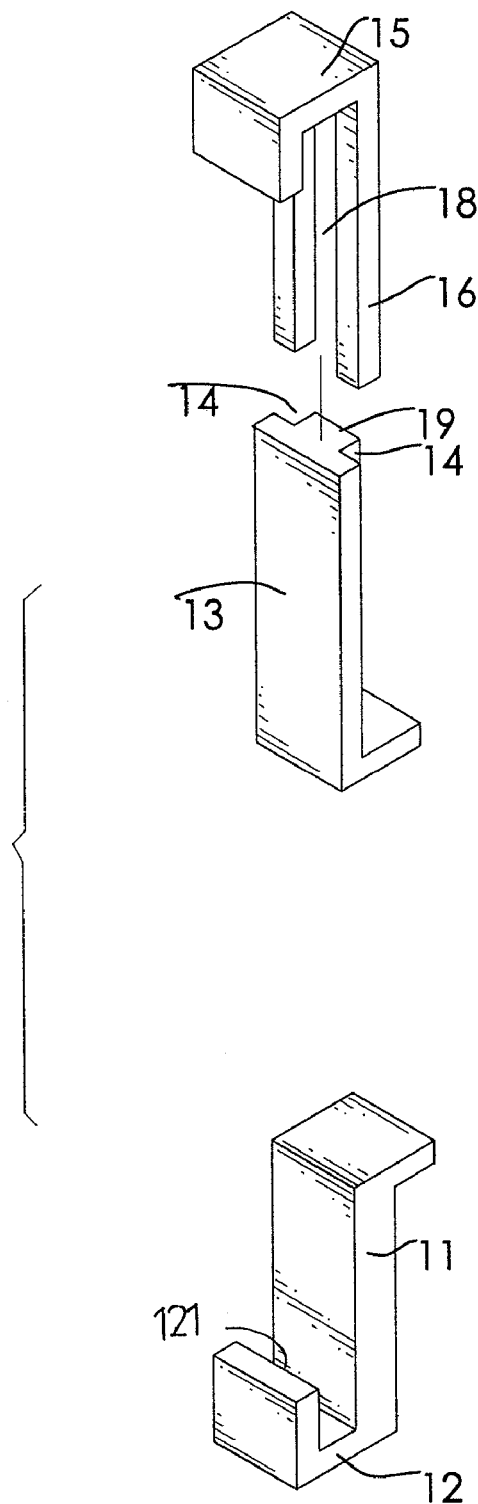
FIG. 1 is an exploded perspective view of a fastening apparatus of a first embodiment of a detachable screen protector assembly in accordance with the present invention.
Figure 2:
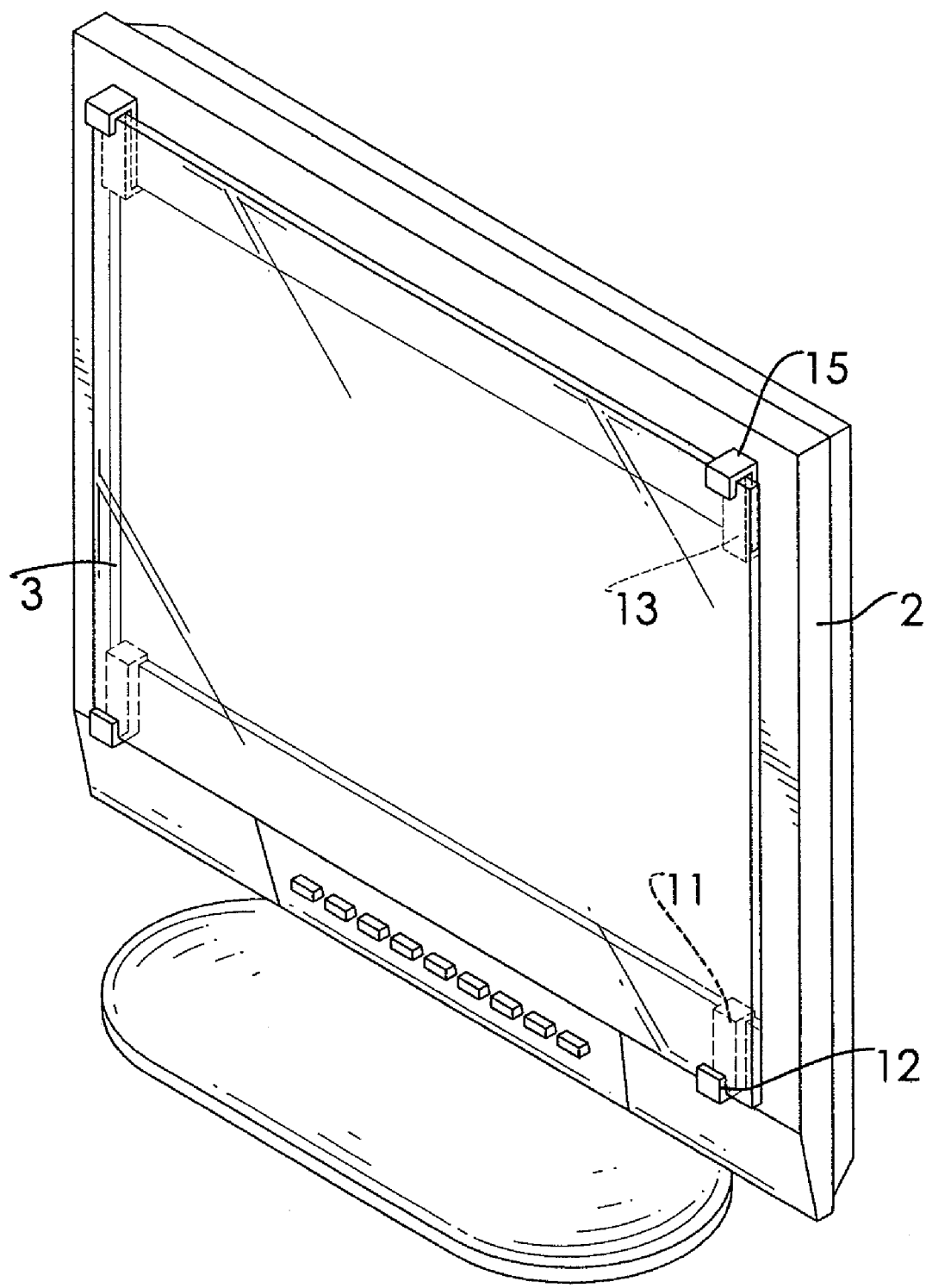
FIG. 2 is an operational perspective view of the detachable screen protector assembly in FIG. 1 with a LCD monitor.
Figure 3:
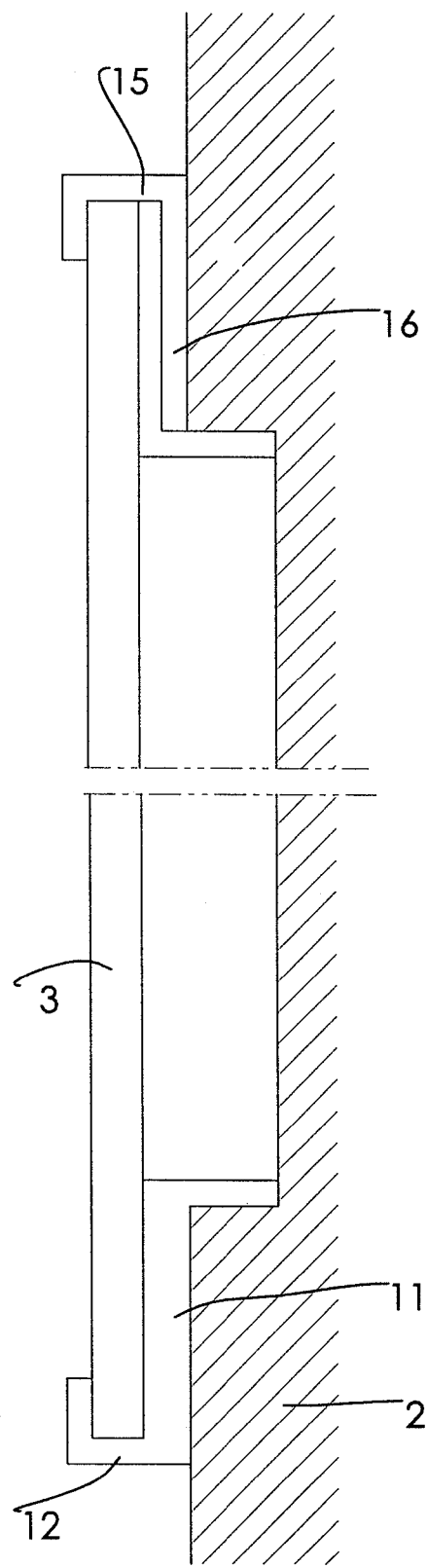
FIG. 3 is an operational side view in partial section of the detachable screen protector assembly in FIG. 2 with the LCD monitor.

With reference to FIGS. 1 to 3, a detachable screen protector assembly in accordance with the present invention is mounted on a screen frame (2) of a monitor to protect a screen of the monitor and has a screen protector (3) and a fastening apparatus. The screen frame (2) has four corners, an upper front surface and a lower front surface.

The screen protector (3) is transparent, is mounted detachably in front of the screen and has a lower edge and an upper edge.

The fastening apparatus is mounted on the screen frame (2), detachably fastens the screen protector (3) on the fastening apparatus and in front of the screen and has at least one couple of a bracket and a detachable hook.

Figures 4, 5:
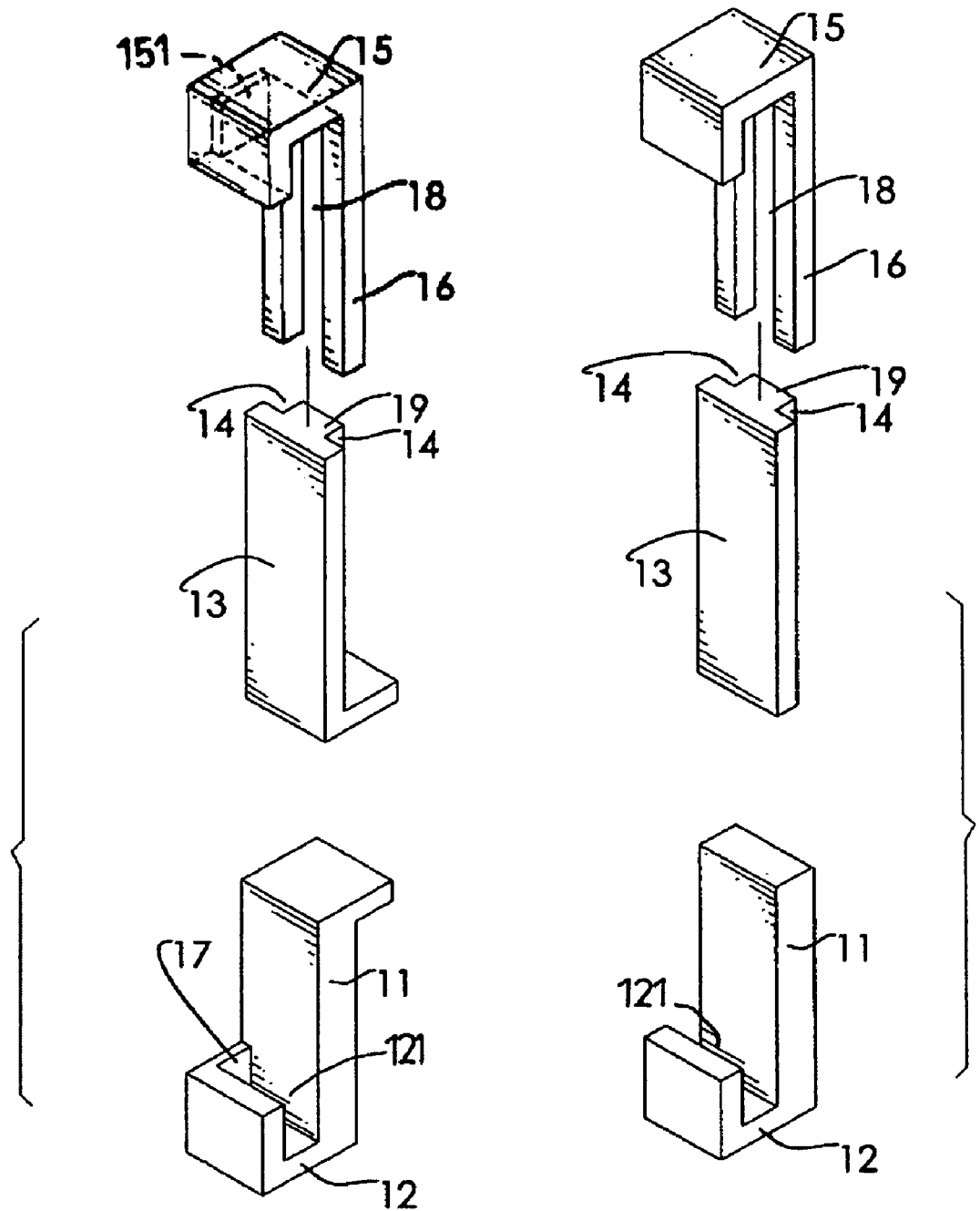
FIG. 4 is a perspective view of a fastening apparatus of a second embodiment of a detachable screen protector assembly in accordance with the present invention.
FIG. 5 is a perspective view of a fastening apparatus of a third embodiment of a detachable screen protector assembly in accordance with the present invention.

With further reference to FIGS. 4 and 5, the bracket is mounted on the lower front surface of the screen frame (2) and has a connecting segment (11) and an L-shaped holder (12). The connecting segment (11) may be I-shaped or inverse-L-shaped and has a front surface and a rear surface. The rear surface of the connecting segment (11) connects to and is mounted on the lower front surface of the screen frame (2) by glue or an adhesive tape. The holder (12) is formed perpendicularly from the front surface of the connecting segment (11) to form a holding space (121), holds the lower edge of the screen protector (3) and may have a tab (17). The holding space (121) holds and receives the lower edge of the screen protector (3) and has two sides. The tab (17) is formed on one side of the holding space (121) to prevent a screen protector (3) from moving right and left when two couples of the bracket and the detachable hook of the fastening apparatus are respectively mounted on four corners of the screen frame (2).

The detachable hook corresponds to and is located above the bracket and is mounted on the upper front surface of the screen frame (2) to allow the screen protector (3) to be mounted between the detachable hook and the bracket and has a bracket member (13) and a hooking member.

The bracket member (13) may be I-shaped or L-shaped, is mounted on the upper front surface of the screen frame (2) and has a rear surface, a protrusion (19) and two insertion spaces (14). The protrusion (19) is formed on and protrudes from the rear surface of the bracket member (13) and has two sides and a rear surface. The rear surface of the protrusion (19) is mounted on the upper front surface of the screen frame (2) by glue or adhesive tape. The insertion spaces (14) are formed adjacent respectively to the two sides of the protrusion (19). The hooking member is attached detachably to the bracket member (13) and has two insertion bars (16), a mounting space (18) and an inverse-L-shaped hooking segment (15). The insertion bars (16) correspond respectively to the insertion spaces (14) in the bracket member (13), are detachably inserted respectively in the insertion spaces (14) after the screen protector (3) is mounted in the holding space (121) in the bracket. The insertion bars (16) disengage from the insertion spaces (14) before the screen protector (3) detaches from the screen. Each insertion bar (16) has an upper end. The mounting space (18) is formed between the insertion bars (16) and is engaged detachably with the protrusion (19) on the bracket member (13). The hooking segment (15) corresponds to the holder (12), is formed on and protrudes perpendicularly from the upper ends of the insertion bars (16) and hooks and holds the upper edge of the screen protector (3). The hooking segment (15) is mounted on the bracket member (13) when the inset bars (16) engage the insertion spaces (14) of the bracket member (13) to prevent the screen protector (3) from leaning forward. The hook segment (15) has two sides and an optional tab (151). The tab (151) corresponds to the tab (17) of the holder (12) and is mounted on one side of the hooking segment (15) to prevent a screen protector (3) from moving right and left when the brackets and the detachable hook of the fastening apparatus are mounted respectively on four corners of the screen frame (2).

Because the hooking member is detachable from the bracket member (13) of the detachable hook, so the screen protector (3) can be detached from the screen frame (2) to be cleaned or to be mounted on other screen frames when people change their monitor.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A detachable screen protector assembly adapted to be mounted on a screen frame of a monitor having a lower front surface and an upper front surface and the detachable screen protector assembly comprising:
   a screen protector being transparent, adapted to be mounted in front of a screen of the monitor and having a lower edge and an upper edge;
   a fastening apparatus adapted to be mounted on the screen frame, detachably fastening the screen protector on the fastening apparatus and having at least one of a bracket and a detachable hook,
   wherein, each one of the at least one bracket is adapted to be mounted on the lower front surface of the screen frame and has
      a connecting segment having
         a front surface; and
         a rear surface adapted to be connecting to and mounted on the lower front surface of the screen frame; and
      a holder holding the lower edge of the screen protector, formed from the front surface of the connecting segment to form a holding space receiving the lower edge of the screen protector;
   each one of the at least one detachable hook corresponds to and is located above a corresponding bracket, is adapted to be mounted on the upper front surface of the screen frame and has
      a bracket member adapted to be mounted on the upper front surface of the screen frame and having
         a rear surface;
         a protrusion formed on and protruding from the rear surface of the bracket member and having
            two sides; and
            a rear surface adapted to be mounted on the upper front surface of the screen frame;
         two insertion spaces formed respectively adjacent to the two sides of the protrusion;
      a hooking member attached detachably to the bracket member and having
         two insertion bars corresponding respectively to the insertion spaces of the bracket member and detachably mounted in the insertion spaces;
         a mounting space formed between the insertion bars and detachably engaging the protrusion on the bracket member; and
         a hooking segment corresponding to a corresponding holder, formed on and protruding from the upper ends of the insertion bars and hooking and holding the upper edge of the screen protector.

2. The detachable screen protector assembly as claimed in claim 1, wherein the holder of each one of the at least one bracket is L-shaped and the hooking segment of each one of the at least one detachable hook is inverse-L-shaped.

3. The detachable screen protector assembly as claimed in claim 2, wherein
   the holder of each one of the at least one bracket further has a holding space having two sides; and
      a tab mounted on one side of the holding space;
   the hooking segment of each one of the at least one detachable hook further has
      two sides; and
      a tab corresponding to the tab of a corresponding holder and mounted on one side of the hooking segment.

4. The detachable screen protector assembly as claimed in claim 1, wherein the connecting segment of each one of the at least one bracket is I-shaped and the bracket member of each one of the at least one detachable hook is I-shaped corresponding to a corresponding connecting segment.

5. The detachable screen protector assembly as claimed in claim 4, wherein
   the holder of each one of the at least one bracket further has
      a holding space having two sides; and
      a tab mounted on one side of the holding space; and
   the hooking segment of each one of the at least one detachable hook further has
      two sides; and
      a tab corresponding to the tab of a corresponding holder and mounted on one side of the hooking segment.

6. The detachable screen protector assembly as claimed in claim 1, wherein the connecting segment of each one of the at least one bracket is inverse-L-shaped and the bracket member of each one of the at least one detachable hook is L-shaped corresponding to a corresponding connecting segment.

7. The detachable screen protector assembly as claimed in claim 6, wherein
   the holder of each one of the at least one bracket further has
      a holding space having two sides; and
      a tab mounted on one side of the holding space;
   the hooking segment of each one of the at least one detachable hook further has two sides; and
    a tab corresponding to the tab of a corresponding holder and mounted on one side of the hooking segment.

8. The detachable screen protector assembly as claimed in claim 1, wherein
   the holder of each one of the at least one bracket further has a holding space having two sides; and
   a tab mounted on one side of the holding space;
   the hooking segment of each one of the at least one detachable hook further has
   two sides; and
   a tab corresponding to the tab of a corresponding holder and mounted on one side of the hooking segment.

\* \* \* \* \*